United States Patent [19]

Posch

[11] Patent Number: 5,137,009
[45] Date of Patent: Aug. 11, 1992

[54] COMBUSTION DEVICE FOR WOOD AND COAL

[76] Inventor: Heribert Posch, Am Rain 125, D-8151 Wall, Fed. Rep. of Germany

[21] Appl. No.: 784,996

[22] Filed: Oct. 30, 1991

[30] Foreign Application Priority Data

Oct. 31, 1990 [DE] Fed. Rep. of Germany ....... 4034671

[51] Int. Cl.⁵ .............................................. F24C 1/14
[52] U.S. Cl. ..................... 126/77; 110/297; 110/302; 110/214; 126/15 R; 126/146; 126/163 R
[58] Field of Search ............... 110/297, 302, 211, 214; 126/65, 77, 15 R, 15 A, 144, 146, 147, 152 R, 163 R

[56] References Cited

U.S. PATENT DOCUMENTS

| 4,290,410 | 9/1981 | Traimer | 126/144 X |
| 4,383,517 | 5/1983 | Gillis et al. | 126/163 X |

FOREIGN PATENT DOCUMENTS

0152317 8/1985 European Pat. Off. ............ 110/302

*Primary Examiner*—Edward G. Favors
*Attorney, Agent, or Firm*—Hoffman, Wasson & Gitler

[57] ABSTRACT

The invention relates to a combustion device for wood or coal comprising a front wall with a fuel charging opening, two side walls, a rear wall, a bottom wall, a top wall, a door for the fuel charging opening, a control element for controlling a fresh-air inlet opening, an inner dividing wall which divides the interior of the device into a pre-combustion chamber and a post-combustion chamber, and a passage opening between the two chambers and a grating at the bottom of the pre-combustion chamber and a flue gas discharge opening; the dividing wall is horizontally disposed and a shaft pipe surrounded by an annular chamber which is in communication with the fresh-air inlet opening is inserted sealingly into its passage opening; the grating is placed on its upper end. The shaft pipe tapers in its cross-section downwardly, the annular chamber is disposed between the outer side of the shaft pipe and the inner side of an outer jacket pipe of the annular chamber and the lower ends of the shaft pipe and of the outer jacket pipe of the annular chamber are connected via a cylindrical or prismatic pipe having air passage openings for the constructionally simple design and optimum combustion conditions.

24 Claims, 2 Drawing Sheets

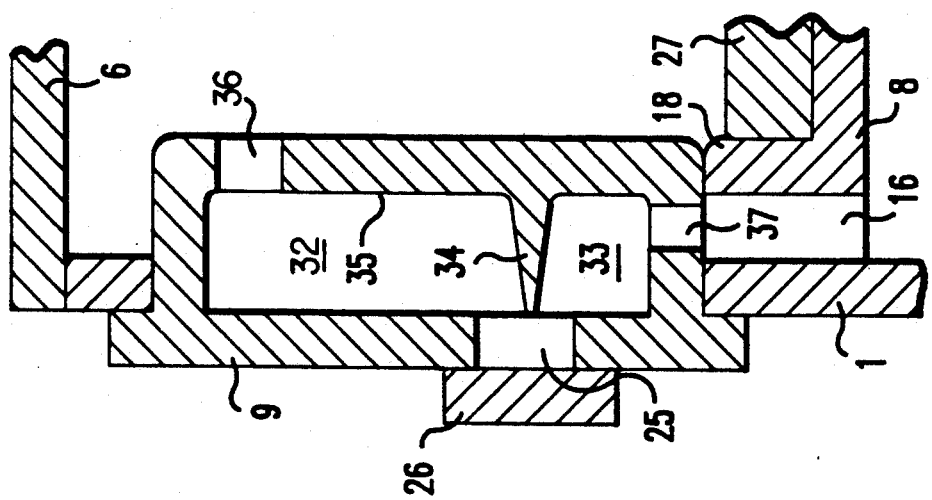
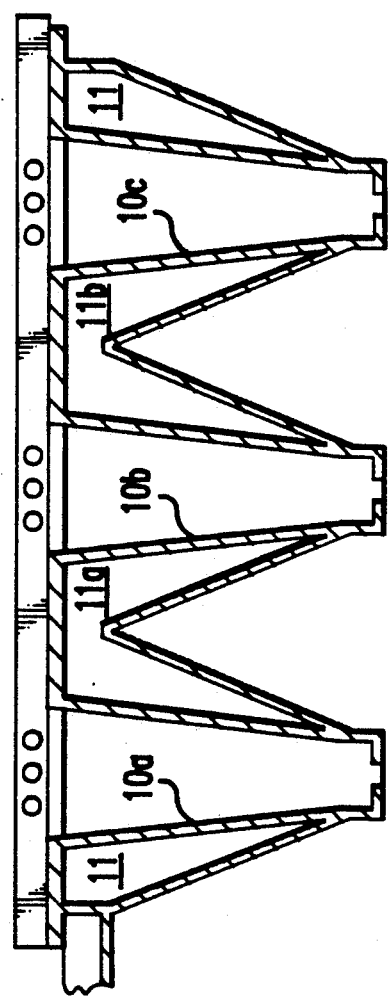
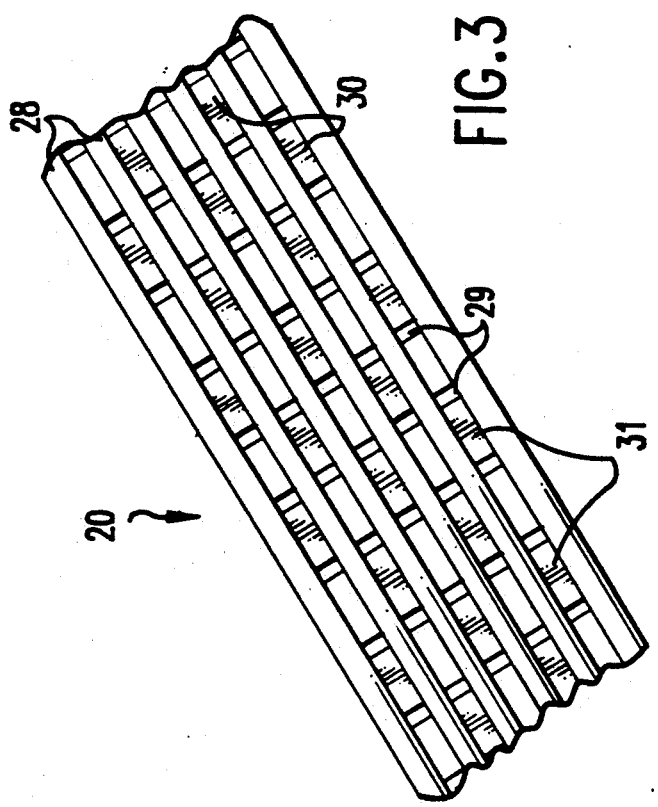

COMBUSTION DEVICE FOR WOOD AND COAL

The invention relates to a combustion device for the burning of coal or wood comprising a front wall with a fuel charging opening, two side walls, one rear wall, a bottom wall and a top wall, a door for the fuel charging opening, a control element for controlling the active cross-section of a fresh-air inlet opening, an inner dividing wall, which divides the interior of the device into a pre-combustion and a post-combustion chamber and in which a passage opening between the two chambers is provided, and a grating at the bottom of the pre-combustion chamber and a flue gas discharge opening, the dividing wall sealingly adjoining the front wall, the side walls and the rear wall and being disposed horizontally, and a shaft pipe surrounding by an annular chamber being in communication with the fresh-air inlet opening being sealingly inserted into the passage opening of the dividing wall, on whose upper end a grating is placed, the fuel charging opening and the fresh-air inlet opening and the flue gas discharge opening being the only openings of the device and the flue gas discharge opening being provided in a side wall or the rear wall in the area of the post-combustion chamber.

A combustion device of the type indicated at the beginning is known from DE 38 33 090-C1. However, this device uses two dividing walls which are in communication with each other in the area of passage openings via a shaft pipe, within which a nozzle body whose manufacture is relatively complex is disposed. This known device, however, is very expensive in its totality due to the production, in particular of the nozzle body of a highly heat-resistant material and its constructionally expensive design, even in the case of mass production so that the basically achievable, environmentally acceptable combustion is not used or only used to a small degree due to the high cost price of the known device.

The invention is based on the object of further developing the combustion device designated as regards its type at the beginning so that still no special experience in the control of the combustion behavior for controlling the calorific output is required; at the same time, the combustion efficiency and the emission behavior are to be improved still further, if possible, but the new design is to allow nevertheless a less expensive manufacturability.

This object is attained according to the invention by the fact that the shaft pipe (10) tapers towards the bottom in its cross-section beginning at its inlet opening located in the area of the grating, that the annular chamber (11) is formed between the outer side of the shaft pipe (10) and the inner side of an outer jacket pipe (12) of the annular chamber and that the lower ends of the shaft pipe (10) and the outer jacket pipe (12) of the annular chamber are connected via a cylindrical or prismatic pipe (13) with air inlet openings (14).

By the provision according to the invention of a simple shaft pipe tapered downwardly in its cross-section and beginning at the passage opening of the single dividing wall and the design of an annular chamber at the outside of the shaft pipe and of an outer jacket pipe of the annular chamber, such a simple construction can be achieved in connection with the cylindrical or prismatic pipe further provided according to the invention, which connects the two lower ends of the shaft pipe and of the outer jacket pipe of the annular chamber with each other and has air passage openings, so that can be implemented in practice without significant costs. This design ensures moreover a quality of the combustion process as is has become known for the first time by means of the device known from DE 38 33 090-C1. The cylindrical or prismatic pipe, which connects the two other pipes with each other at their lower ends can absolutely be downwardly extended beyond the mutual connection. The burnable gas flow of the pre-combustion chamber flows through the interior of the shaft pipe and of the cylindrical or prismatic pipe, secondary air being supplied via the air passage openings in the cylindrical or prismatic pipe so that the gas mixture formed by this is completely burnable in the post-combustion chamber. The secondary air passing through the air passage opening experiences such a considerable heating in the annular chamber which is acted upon by the heat of the post-combustion chamber at the outside that no noticeable temperature reduction occurs upon its admixture to the burnable gas flow of the pre-combustion chamber. The secondary air experiences in particular a heating to more than 500° C., for which reason the burnable gases do not lose their ignition temperature when secondary air is admixed.

It is of course left to the discretion of the designer in particular cases to design the cross-section of the outer jacket pipe of the annular chamber, the shaft pipe and the prismatic pipe with a rectangular cross-section. However, nevertheless, a round cross-section of the individual elements and also of the stove itself comes of course also into consideration; in which case the front wall, the side walls and the rear wall being formed by correspondingly located areas of the peripheral wall of the stove, which is round when viewed from above.

An inwardly directed circumferential web should be provided at the lower free end of the cylindrical or prismatic pipe to improve the admixture of secondary air to the burnable gas flow in the interior of the cylindrical or prismatic pipe. Said web forms practically an impact surface for the secondary air, so that the unmixed, parallel flowing past of the burnable gases is prevented. The secondary air is thus deflected in the direction towards the center of the burnable gases by the circumferential web and thoroughly admixed to them.

The design of half the apex angle in the order of 20 degrees to 45 degrees, in particular of 25 degrees to 35 degrees is advisable for the design of the shaft pipe with its downwardly directed cross-sectional taper, while half the apex angle of the outer jacket pipe of the annular chamber, which also tapers downwardly in its cross-section, should be in the order of 25 degrees to 60 degrees. Due to the larger design of the apex angle of the outer jacket pipe of the annular chamber with respect to the shaft pipe, the depositing of solid particles is prevented in the interior of the annular chamber behind the air passage openings.

Due to the high temperatures of the combustion in the post-combustion chamber, the shaft pipe, the outer jacket pipe of the annular chamber and the cylindrical or prismatic pipe should be manufactured from highly heat-resistant sheet steel.

In addition to the chamotte lining in the interior of the stove, such a lining should also be provided on the upper side of the dividing wall dividing the interior of the stove into the pre-combustion chamber and the post-combustion chamber. Due to the heat stored in this chamotte lining, sufficient heat for heating the secondary air can also be made available to the pre-combustion chamber in the end phase of the combustion of a fuel charge so that a perfect post-combustion is also ensured in this phase.

The combustion process in its totality takes place as follows. The fuel is gasified and partly burnt in the pre-combustion chamber under the influence of the primary air. The residues of the combustion fall through the grating, then get into the interior of the shaft pipe and fall down to the bottom of the post-combustion chamber. Inasmuch as these fuel residues, e.g. small coal particles or the like, are still capable of being further burnt away, they burn away in the post-combustion chamber. At the same time, the burnable gases and waste gases obtained in the pre-combustion chamber pass through the grating, get into the interior of the shaft pipe and are mixed there with secondary air, as already indicated. At the same time, a targeted combustion takes place in the post-combustion chamber directly after the admixture.

The air (primary air) required in the pre-combustion chamber and the air (secondary air) required in the post-combustion chamber can be supplied from the outside via one fresh-air inlet opening each. However, the supply via a joint inlet opening is preferred.

The division of the total air entering through a joint fresh-air inlet opening into primary air and secondary air can be effected automatically by the arrangement of the opening in the door for the fuel charging opening and a corresponding design of this door. No external intervention is required for a correct division; the arrangement of the fresh-air inlet opening at a suited height in the door and its design are decisive. The control element to be then provided on the door only serves for throttling the calorific output by primarily influencing the amount of primary air. The door should have a chamber for the automatic division of fresh-air, the primary or secondary air leaving the upper or lower chamber part by one opening each.

Due to the provision of only a single fresh-air inlet opening with associated control element the operability of the combustion device according to the invention is basically as simple as possible; this is true irrespective of the fact whether the fresh-air inlet opening is disposed in the door or elsewhere.

Extensive combustion tests for determining the optimum size ratios for specific calorific outputs and in particular for checking the emission behavior and the combustion efficiency have also shown for the newly designed combustion device according to the invention that the most unfavorable CO emission value, which occurs during the heating up phase, is far below the average maximum CO emission value of 6,000 ppm CO for stoves with solid fuels admissible according to legal regulations; the measured most unfavorable maximum values are between 2,000 and 3,000 ppm CO, while the average value is only at 1,000 to 1,200 ppm CO. These values are not only better than legally admissible, but are even below the values achieved so far elsewhere. The achieved combustion efficiency with just under 90% and, sometimes, even with clearly above 90% is also by far better than the minimum efficiency of 75% admissible according to regulations. A customary heating up flap may of course be provided for optimizing the combustion behavior during the heating up phase, which is only opened during the heating up. Since this flap remains closed as for the rest, the combustion charging opening with its integrated fresh-air inlet opening and the flue gas discharge opening represent actually the only real openings of the combustion device.

Care can be taken for an optimum division of the fresh air into primary air and secondary air by means of the door described above by disposing the fresh-air inlet opening in the lower third of the height of the pre-combustion chamber, preferably in the area of the lower 20% of the height of it. Such a dimensioning proved to be the optimum during combustion tests.

From this viewpoint, the use of a double-chamber door also comes alternatively into consideration, whose one chamber is in communication with the pre-combustion chamber and whose other door is in communication with the air duct.

The design of the control element as a flap is sufficient for the unproblematic adjustment of the combustion conditions, which is pivotable between two end positions and can only be locked in the same. The air inlet opening is completely closed in the one end position, while the other position is the operating position which must not be changed and ensures optimum combustion conditions. Thus the operator is relieved of the necessity by the corresponding design of the control element of having to reset several times, perhaps after an intermediate observation of the combustion conditions, in order to find the respectively correct relation between the amounts of primary air and secondary air.

The arrangement of the flue gas discharge opening within the post-combustion chamber is also of importance for a good emission behaviour; it is advisable in this respect that the flue gas discharge opening is disposed at half the height as a maximum, preferably in the lower third of the height of the post-combustion chamber.

The grating should be composed of round grating rods in view of the avoiding of solids deposits in the grating area. A free passage cross-section of the grating reduced to about 50% should be provided for the combustion of wood as compared to the combustion of coal, so that it must not be worked with an excess of air. A sectionwise locking of the grating comes preferably into consideration for this, the closed sections having to be disposed in staggered relationship between two grating rods opposite to the closed sections between two adjacent grating rods. Due to this, the distance of the grating rods necessary per se can be maintained unchanged.

Also, a sealingly closable opening should of course be provided in the front wall in the area of the post-combustion chamber to remove the ash from the post-combustion chamber.

In the following the invention will be described in greater detail with reference to the drawing.

FIG. 3 shows a special grating for wood.

FIG. 4 shows a vertical cross-section through the door of the combustion device along line IV—IV of FIG. 2 and FIG. 5 shows a schematic partial vertical section similar to the representation of FIG. 1, but through a combustion device with several shaft pipes.

Figure 2:
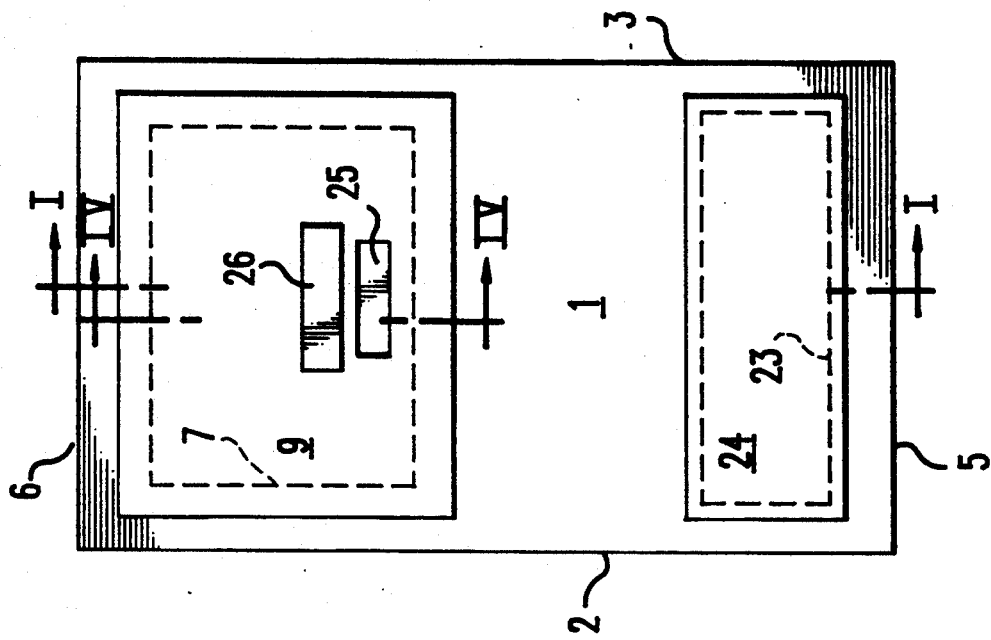
FIG. 2 shows a front view of the combustion device.

Seen in peripheral direction, the combustion device being rectangular when viewed from above consists in the represented example of embodiment of a front wall 1, two side walls 2, 3 and a rear wall 4 and a bottom wall 5 and a top wall 6. A relatively very large opening 7 is provided in the front wall 1, which represents the fuel charging opening.

A dividing wall 8 is provided in the interior of the device, in which a passage opening is centrally formed. In view of the rectangular design of the device in its entirety, seen as an elevation, the passage opening is of a rectangular design, seen as an elevation, namely the long side of the rectangle extends in the direction of width of the device in the represented example of embodiment, namely between the two side walls 2 and 3 of it, while the narrow side of the rectangle extends in parallel to the plane of the drawing.

A shaft pipe 10 is inserted into the passage opening, which is surrounded by an annular chamber 11 closed per se. The shaft pipe 10 can, however, also adjoin the passage opening directly, i.e. in sealing fashion instead of being inserted into the passage opening.

An outer jacket pipe 12 of the annular chamber serves for forming the annular chamber 11 at the outer side of the shaft pipe 10, which is connected to the dividing wall 8 with its upper end and is substantially designed as downwardly tapered pipe in the lower area. A correspondingly downwardly directed taper is also provided in the shaft pipe 10. The lower ends of the shaft pipe 10 and of the outer jacket pipe 12 of the annular chamber are connected with each other via a prismatic pipe 13, air passage openings 14 being provided in the latter one, via which the air of the annular chamber 11 can enter into the interior of the prismatic pipe 13.

The lower free end of the prismatic pipe 13 has an inwardly directed circumferential web 15, which directs the air supplied via the air passage openings 14 in the direction towards the center of the burnable gases flowing through the prismatic pipe and thus leads to a good mixing.

The downwardly tapered design of the outer jacket pipe 12 of the annular chamber serves for the fact that no solids particles can acummulate behind the air passage openings 14 in the annular chamber 11 which would lead to a clogging of the openings 14.

This annular chamber 11 is continued in the area of the front wall 1 in the form of an air duct 16 through the dividing wall 8 beyond it, i.e. up into the pre-combustion chamber 17 located above the dividing wall 8, due to the fresh-air inlet opening being located at a higher level than the dividing wall 8 in the represented example of embodiment. A rear wall 18 of the duct originates from the upper side of the dividing wall 8 in said area to form the air duct 16, which is laterally in communication with the front wall 1 via the side walls 16 of the duct. The air duct 16 is upwardly open and ends at about 20% of the height of the pre-combustion chamber 17, as a maximum, in the area of the fuel charging opening 7.

If the fresh-air inlet opening would be at the level of the annular chamber 11, the air duct 16 would be superfluous and the secondary air could be directly supplied to the annular chamber 11; however, then a supply possibility for the primary air to the pre-combustion chamber 17 would have to be provided.

The fresh-air inlet opening may of course also be optionally disposed, namely seen both in height direction and in peripheral direction. The guiding of the air in the interior of the combustion device is only of importance, namely as primary air to the pre-combustion chamber and as secondary air to the post-combustion chamber.

A grating 18 is provided in the area of the passage opening of the dividing wall 8, and thus in the area of the inlet end of the shaft pipe 10. The slots of the grating 18 are dimensioned in such fashion that only such parts of the fuel can fall through, which are burnt completely or almost completely during post-combustion.

The chamber located below the dividing wall 8 or the outer jacket pipe 12 of the annular chamber represents a post-combustion chamber 21. Originating at the lower fifth of the height of it, a flue gas discharge opening 22 traverses the rear wall 4. An opening 23 is provided at the front side of the post-combustion chamber 21, which serves for removing the ash from the post-combustion chamber 21. This opening 23 is sealingly closed by a door 24.

The fuel charging opening 7 also represents in the represented special embodiment of the combustion device according to the invention at the same time the fresh-air inlet opening with respect to the front wall 1, which has an inlet opening 25, which has only a relatively very small cross-section in the area of an associated door 9. A flap 26 for closing the opening 25 is associated to this opening 25.

The fresh-air inlet opening is disposed at about 20% of the height of the pre-combustion chamber 17 in the concept according to the invention, i.e. substantially there where the upper end of the air duct 16 is located. The flap 26 can be pivoted between a closed position and an open position, the actual operating condition, and is only lockable in these positions. Intermediate positions of the flap 16 are thus not planned.

A lateral division of the opening 25 can of course also be provided instead of the upper or lower part of the opening 25 for primary or secondary air, which requires, however, a slide design which is different from the one represented.

The secondary air entering through the lower part of the opening 25 gets at first into the air duct 16 and from there into the annular chamber 11. The later one is well supplied with heat due to the combustion of fuel in the pre-combustion chamber 17, which passes through the upper dividing wall 8. In order to be able to heat the secondary air supplied to the annular chamber still relatively well, even after a great reduction of the primary air supply to the pre-combustion chamber 17 in the annular chamber during a specific period of time, a chamotte lining 27 is provided at the upper side of the upper dividing wall 8, which represents practically a longterm heat storage.

The secondary air entering into the annular chamber 11 is heated there to a great extent, e.g. to a temperature of more 500° C. The strongly heated secondary air gets from the annular chamber 11 into the interior of the shaft pipe 10 via the passage openings 15.

The secondary air guided in this fashion is mixed with the waste gases and burnable gases of the pre-combustion chamber 17 in the interior of the shaft pipe 10, namely without a noticeable temperature reduction, at any rate without such a temperature reduction below the ignition temperature of the burnable gases. Therefore the very strongly heated secondary air is available for the burning away of the burnable gases so that the post-combustion can take place very effectively.

The pre-combustion of the fuel in the pre-combustion chamber 17 takes place with the cooperation of the primary air entering through the upper part of the fresh-air inlet opening 25. This pre-combustion represents largely also a gasification of the fuel, burnable gases being formed which are burnt away in the post-combustion chamber 21.

All walls of the combustion device can of course be provided with a chamotte lining in conventional and customary fashion. Only the shaft pipe 10, the outer jacket pipe 12 of the annular chamber and the cylindrical pipe 13 are elements which are not lined, and especially highly heat-resistant sheet steel must be used for their production.

The grating 20 consists according to FIG. 3 grating rods 28 of round cross-section, which are connected at a distance of 6 mm as a minimum and 12 mm as a maximum with each other via spacers 29 and have a diameter of 15 mm as a minimum and 30 mm as a maximum. The round cross-sectional shape of the grating rods 28 serves for preventing the formation of deposits of solid particles of the gas flow passing through the grating 20. The number of grating rods 28 depends on the size of the passage opening in the dividing wall 8.

It proved to be necessary in the case of the burning of wood to avoid an air excess to keep the free passage cross-section of the grating 20 smaller than in the case of the burning of coal; a cross-sectional area reduced by 50% comes in particular into consideration. However, since, on the other hand, the distance of the grating rods 28 must not be optionally reduced if the combustion conditions are not to be impaired in another way, it is provided according to FIG. 3 to reduce the free passage area, to close the cross-section free per se sectionwise, e.g. by the fact that a closed section 31 follows an open section 30 between two adjacent grating rods 28. In order to achieve uniform combustion conditions all over the grating, it is advisable in this case to stagger the open or closed sections 30 or 31 of successive pairs of grating rods 28 with respect to each other.

Figure 1:
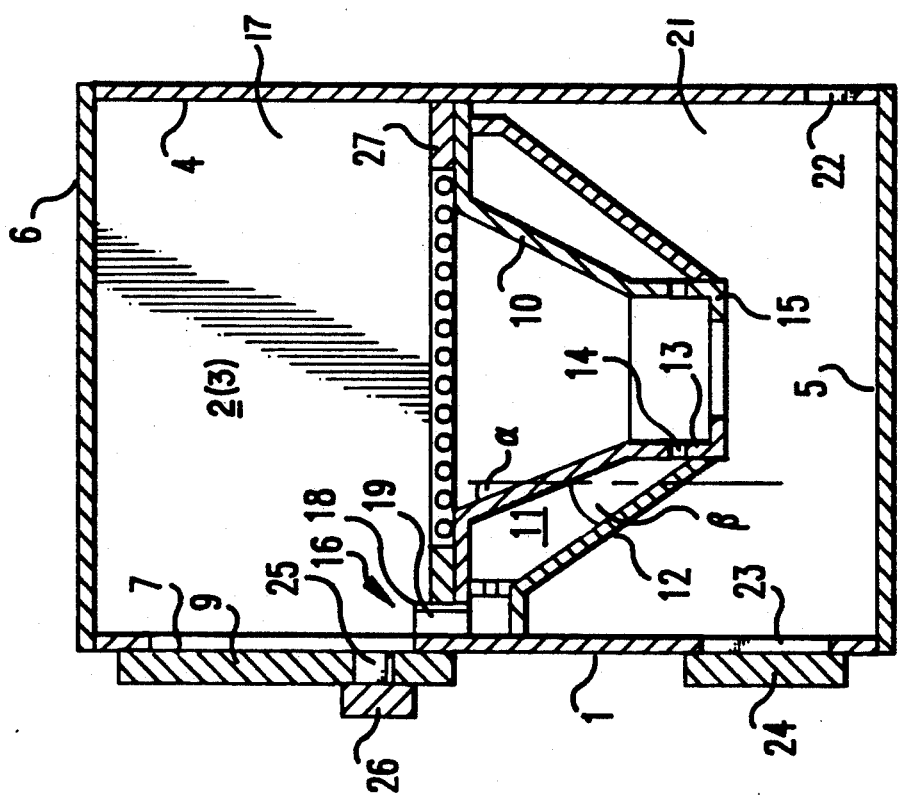
FIG. 1 shows a vertical longitudinal section along the depth direction through the combustion device to be exclusively understood as exemplary along line I—I of FIG. 2.

The door represented in FIG. 1 only relatively schematically can be designed as double-chamber door according to FIG. 4. Two chambers 32 and 33 are designed separated from each other by means of a dividing wall 34 in this door. The dividing door 34 starts from the inner rear wall surface 35 of the door 9 and extends up into the area of the fresh-air inlet opening 25 in the front wall of the door 9. The two chambers 32, 33 are in communication with the pre-combustion chamber 17 via one opening 36 or 37 each in the rear door area or with the annular chamber 11 via the air duct 12. The separation of the air entering through the opening 25 into primary and secondary air is carried out by means of the dividing wall 34.

However, the door may also be designed without the dividing wall 34, the separation into primary and secondary air being then ensured practically automatically by the arrangement of the openings 36 and 37 at the corresponding height in the rear area of the aforementioned door.

The combustion device according to the invention can be both a built-in stove, around which a stove fitter builds the tiled part of a tiled stove maintaining the necessary air conduction spaces and a basic stove, irrespective of whether it is wholly or partly prefabricated in a factory or erected on site from individual elements by a stove fitter, and a heating furnace, in or around which the necessary water or air guides with the associated heat exchanger means must certainly be still installed, which, however, do not affect the concept according to the invention of the actual combustion part and are, in turn, also not affected by it.

Instead of the represented arrangement of the pre-combustion chamber above the post-combustion chamber described in detail, the two combustion chambers may also be disposed conversely, i.e. the post-combustion chamber above the pre-combustion chamber or in a common plane. A grating is not required in the two cases. These variants allow just as good combustion results, the variant with the post-combustion chamber above the pre-combustion chamber being suited for the construction of open fireplaces.

Several shaft pipes 10a, 10b, 10c may be inserted in a side-by-side relationship in the passage opening of the dividing wall 8 instead of a single shaft pipe 10 as this is revealed by FIG. 1. It is suitable in this case to design all shaft pipes identically and to provide a duct 11a, 11b in each case between two adjacent shaft pipes, which connects opposite areas of the annular chamber 11 and thus practically forms a component of the annular chamber 11, at any rate in fluidic respect. This design ensures still further improved combustion conditions, because the walls of the shaft pipe located transversely to the rods of the grating are disposed at a relatively small distance to each other, which promotes flame and gas guiding.

The shaft pipes 10a, 10b, 10c of FIG. 5, which are located side by side can of course be located side by side in the direction rotated by 90° contrary to the representation in FIG. 5; in this case a representation according to FIG. 5 results, in which the rods of the grating extend in parallel to and in the plane of the drawing instead of being located transversely to the plane of the drawing.

I claim:

1. A combustion device for the burning of coal or wood comprising a front wall with a fuel charging opening, two side walls, one rear wall, a bottom wall and a top wall, a door for the fuel charging opening, a control element for controlling the active cross-section of a fresh-air inlet opening, an inner dividing wall, which divides the interior of the device into a pre-combustion and a post-combustion chamber and in which a passage opening between the two chambers is provided, and a grating at the bottom of the pre-combustion chamber and a flue gas discharge opening, the dividing wall sealingly adjoining the front wall, the side walls and the rear wall and being disposed horizontally, a shaft pipe surrounding by an annular chamber being in communication with the fresh-air inlet opening being sealingly inserted into the passage opening of the dividing wall, on whose upper end a grating is placed, the fuel charging opening and the flue gas discharge opening being the only openings of the device and the flue gas discharge opening being provided in a side wall or the rear wall in the area of the post-combustion chamber, characterized in that the shaft pipe (10) tapers towards the bottom in its cross-section beginning at its inlet opening in the area the grating, that the annular chamber (11) is formed between the outer side of the shaft pipe (10) and the inner side of an outer jacket pipe (12) of the annular chamber and that the lower ends of the shaft pipe (10) and the outer jacket pipe (12) of the annular chamber are connected via a cylindrical or prismatic pipe (13) having air inlet openings (14).

2. A combustion device according to claim 1, characterized in that the outer jacket pipe (12) of the annular chamber, the shaft pipe (10) and the prismatic pipe (13) are of a rectangular cross-sectional design.

3. A combustion device according to claim 1, characterized in that an inwardly directed circumferential web (15) is provided at the lower free end of the cylindrical or prismatic pipe (13).

4. A combustion device according to claim 1, characterized in that half the apex angle ($\alpha$) of the shaft pipe (10) downwardly tapered in its cross-section is smaller than 45 degrees and greater than 20 degrees.

5. A combustion device according to claim 4, characterized in that half the apex angle ($\alpha$) of the shaft pipe (10) is in the range between 25 and 35 degrees.

6. A combustion device according to claim 1, characterized in that the outer jacket pipe (12) of the annular chamber is a pipe downwardly tapered in its cross-section.

7. A combustion device according to claim 6, characterized in that half the apex angle ($\beta$) of the outer jacket pipe (12) of the annular chamber downwardly tapered in its cross-section measures 60 degrees as a maximum and 25 degrees as a minimum at least in the area of the connection to the cylindrical pipe (13).

8. A combustion device according to claim 1, characterized in that the shaft pipe (10), the outer jacket pipe (12) of the annular chamber and the cylindrical or prismatic pipe (13) consist of highly heat-resistant sheet steel.

9. A combustion device according to claim 1, characterized in that a chamotte lining (27) is provided on the upper side of the dividing wall (8).

10. A combustion device according to claim 1, characterized in that the fresh-air inlet opening (25) is disposed in the door (9) in the lower third of the height of the pre-combustion chamber (17), preferably in the area of the lower 20% of the height of it.

11. A combustion device according to claim 10, characterized in that the fresh-air inlet opening (25) is provided in the door (9) for the fuel charging opening.

12. A combustion device according to claim 1, characterized in that the door for the fuel charging opening forms at the same time the front wall of the device.

13. A combustion device according to claim 1, characterized in that the control element (26) is designed as a flap, which can be pivoted between two end positions and is only lockable in them, the air inlet opening (25) being completely closed in the one end position.

14. A combustion device according to claim 1, characterized in that the width and the depth of the pre-combustion chamber (17) and/or the post-combustion chamber (21) are approximately of equal size.

15. A combustion device according to claim 1, characterized in that the flue gas discharge opening (22) is disposed at half the height below the free end of the cylindrical or prismatic pipe (13) at the most.

16. A combustion device according to claim 1, characterized in that a sealingly closable opening (23) is provided in the front wall (1) as an access to the post-combustion chamber (21).

17. A combustion device according to claim 1, characterized in that the door (9) comprises a chamber (32, 33), whose lower and upper part are in communication with the pre-combustion chamber (17) or the air duct (16) via one opening (36, 37) each in the rear area of the door (9).

18. A combustion device according to claim 1, characterized in that the fresh-air inlet opening (25) is disposed at a higher level than the annular chamber (11) and that the latter is continued beyond the dividing wall (8) in the form of an air duct (16) in the area of the front wall (1), this air duct (16) being in communication with the fresh-air inlet opening (25).

19. A combustion device according to claim 1, characterized in that the grating (28) consists of grating rods (28) of round cross-section, which are disposed at a distance of 6 mm as a minimum and 12 mm as a maximum from each other and have a diameter of 15 mm as a minimum and 30 mm as a maximum.

20. A combustion device according to claim 19 for the combustion of wood, characterized in that the passage cross-section between the grating rods (28), which is free per se, is closed sectionwise in such fashion that half the cross-sectional area is only still available for the free passage, the closed section areas 31) being staggered with respect to each other between two successive pairs of grating rods (28).

21. A combustion device according to claim 1, characterized in that the outer jacket pipe (12) of the annular chamber forms substantially the top wall of the post-combustion chamber.

22. A combustion device according to claim 1, characterized in that several shaft pipes (10a, 10b, 10c) surrounded jointly by the annular chamber (11) are inserted in adjoining relationship in the passage opening of the dividing wall (8).

23. A combustion device according to claim 22, characterized in that all shaft pipes (10a, 10b, 10c) are of identical design.

24. A combustion device according to claim 22, characterized in that a duct (11a, 11b) connecting opposite areas of the annular chamber (11) with each other is provided in each case between two adjacent shaft pipes (10a, 10; 10b, 10c).

* * * * *